United States Patent [19]

Wächtler et al.

[11] Patent Number: 5,002,694
[45] Date of Patent: Mar. 26, 1991

[54] NITROGEN-CONTAINING HETEROCYCLIC COMPOUNDS

[75] Inventors: Andreas Wächtler, Griesheim; Rudolf Eidenschink, Münster; Joachim Krause, Dieburg, all of Fed. Rep. of Germany; Bernhard Scheuble, Yokohama, Japan

[73] Assignee: Merck Patent Gesellschaft mit beschrankter Haftung, Darmstadt, Fed. Rep. of Germany

[21] Appl. No.: 71,226

[22] PCT Filed: Sep. 15, 1986

[86] PCT No.: PCT/EP86/00530
§ 371 Date: May 13, 1987
§ 102(e) Date: May 13, 1987

[87] PCT Pub. No.: WO87/01701
PCT Pub. Date: Mar. 26, 1987

[30] Foreign Application Priority Data

Sep. 18, 1985 [DE] Fed. Rep. of Germany ....... 3533333

[51] Int. Cl.$^5$ ............................ G02F 1/13; C09K 3/34
[52] U.S. Cl. .................... 252/299.61; 252/299.01; 252/299.63; 350/350 R; 350/350 S; 544/315; 544/242; 544/283; 544/286; 544/298; 544/316; 544/318; 544/335; 544/224; 544/235; 544/239; 544/336; 544/406; 544/408; 544/215; 544/216; 544/219; 544/180; 546/290; 546/298; 546/300; 546/322; 546/346; 546/1; 546/318; 546/316; 546/303; 546/330; 546/342; 546/341; 546/339

[58] Field of Search ............ 252/299.61, 299.01, 252/299.65, 299.66, 299.63; 350/350 S, 250 R; 544/242, 283, 286, 298, 316, 318, 334, 335, 224, 235, 239, 336, 406, 408, 409, 410, 179, 215, 216, 217, 219, 180; 546/290, 298, 300

[56] References Cited

U.S. PATENT DOCUMENTS

| | | | |
|---|---|---|---|
| 4,510,069 | 4/1985 | Eidenschink et al. | 252/299.63 |
| 4,576,732 | 3/1986 | Isogai et al. | 252/299.01 |
| 4,622,163 | 11/1986 | Huynh-Ba et al. | 252/299.61 |
| 4,629,581 | 12/1986 | Boller et al. | 252/299.63 |
| 4,686,289 | 8/1987 | Huynh-Ba et al. | 252/299.61 |
| 4,723,005 | 2/1988 | Huymh-Ba et al. | 252/299.61 |
| 4,725,688 | 2/1988 | Taguchi et al. | 252/299.61 |
| 4,737,311 | 4/1988 | Scheudle et al. | 252/299.61 |
| 4,752,414 | 6/1988 | Eidenschimk et al. | 252/299.61 |
| 4,776,973 | 10/1988 | Bofinger et al. | 252/299.61 |
| 4,777,280 | 10/1988 | Eidman et al. | 252/299.67 |
| 4,913,837 | 4/1990 | Gray et al. | 252/299.61 |
| 4,925,278 | 5/1990 | Buchecker et al. | 252/299.63 X |
| 4,943,384 | 7/1990 | Sucrow et al. | 252/299.61 |

FOREIGN PATENT DOCUMENTS

| | | | |
|---|---|---|---|
| 131837 | 1/1985 | European Pat. Off. | 252/299.61 |
| 248335 | 12/1987 | European Pat. Off. | 252/299.61 |
| 3500909 | 7/1986 | Fed. Rep. of Germany | 252/299.61 |
| 3515373 | 11/1986 | Fed. Rep. of Germany | 252/299.61 |
| 3600052 | 7/1987 | Fed. Rep. of Germany | 252/299.61 |
| 3706766 | 9/1987 | Fed. Rep. of Germany | 252/299.63 |
| 240385 | 10/1986 | German Democratic Rep. | 252/299.61 |
| 2166754 | 5/1986 | United Kingdom | 252/299.61 |
| 8606401 | 11/1986 | World Int. Prop. O. | 252/299.61 |
| 8607055 | 12/1986 | World Int. Prop. O. | 252/299.61 |
| 8705012 | 8/1987 | World Int. Prop. O. | 252/299.61 |

Primary Examiner—Robert L. Stoll
Assistant Examiner—Gary L. Geist
Attorney, Agent, or Firm—Millen, White & Zelano, P.C.

[57] ABSTRACT

Nitrogen-containing heterocyclic compounds of the formula II

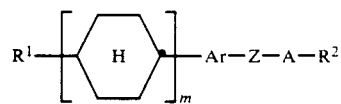

wherein $R^1$ and $R^2$ in each case denote an alkyl group having 1 to 15 C atoms, wherein one or more $CH_2$ groups may also be replaced by a grouping selected from the group comprising —O—, —S—, —CO—, —O—CO—, —O—COO—, —CO—O—, —CH=CH—, —CH—halogen and —CHCN—, or else by a combination of two suitable groupings, two heteroatoms not being directly linked to each other, m denotes 0 or 1, Ar denotes '1,4-phenylene, 4,4'-biphenylyl or 2,6-naphthylene, wherein one or more CH groups are in each case replaced by N, Z denotes —C—O—, —O—CO—, —CH$_2$O—, —OCH$_2$—, —CH$_2$CH$_2$—, —CH$_2$CHCN—, —CHCNCH$_2$—, —CH=CH or a single bond, and A denotes unsubstituted 1,4-cyclonexylene or 1,4-cyclohexylene substituted in position 1 or position 4 by CN, with the proviso that if A = unsubstituted 1,4-cyclohexylene, Z denotes —CHCNCH$_2$— or —CH$_2$CHCN— and/or at least one CH$_2$ group is replaced by —CHCN— in at least one of the radicals $R^1$ and $R^2$, are suitable for use as components of smectic liquid-crystalline phases.

7 Claims, No Drawings

NITROGEN-CONTAINING HETEROCYCLIC COMPOUNDS

The present invention relates to nitrogen-containing heterocyclic compounds of the formula II

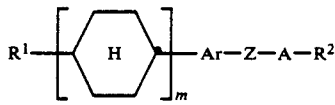

wherein
$R^1$ and $R^2$ in each case denote an alkyl group having 1 to 15 C atoms, wherein one or more $CH_2$ groups may also be replaced by a grouping selected from the group comprising —O—, —S—, —CO—, —O—CO—, —O—COO—, —CO—O—, —CH=CH—, —CH—halogen and —CHCN—, or else by a combination of two suitable groupings, two heteroatoms not being directly linked to each other,
m denotes 0 or 1,
Ar denotes 1,4-phenylene, 4,4'-biphenylyl or 2,6-naphthylene, wherein one or more CH groups are in each case replaced by N,
Z denotes —CO—O—, —O—CO—, —CH$_2$O—, —OCH$_2$—, —CH$_2$CH$_2$—, —CH$_2$CHCN—, —CHCNCH$_2$—, —CH=CH—or a single bond, and
A denotes unsubstituted 1,4-cyclohexylene or 1,4-cyclohexylene substituted in position 1 or position 4 by CN,
with the proviso that if A=unsubstituted 1,4-cyclohexylene, Z denotes —CHCNCH$_2$— or —CH$_2$CHCN— and/or at least one $CH_2$ group is replaced by —CHCN— in at least one of the radicals $R^1$ and $R^2$, their use as components of smectic liquid-crystalline phases, and also to smectic crystalline phases, in particular, chiral tilted smectic phases containing compounds of the formula II.

BACKGROUND OF THE INVENTION

Chiral tilted smectic liquid-crystalline phases with ferroelectric properties can be prepared by adding a suitable chiral dopant to basic mixtures having one or more tilted smectic phases (L.A. Beresnev et al., Mol. Cryst. Liq. Cryst. 89, 327 (1982); H. R. Brand et al., J. Physique 44, (lett.), L-771 (1983)).

Such phases can be used as dielectrics for fastswitching displays which are based on the principle of SSFLC technology described by Clark and Lagerwall (N. A. Clark and S. T. Lagerwall, Appl. Phys. Lett. 36, 899 (1980); U.S. Pat. No. 4,367,924) which is based on the ferroelectric properties of the chiral tilted phase. In said phase the long molecules are arranged in layers, the molecules having an angle of tilt to a line perpendicular to the layer. On proceeding from layer to layer, the direction of tilt changes by a small angle with respect to an axis situated perpendicular to the layers so that a helical structure is formed. In displays which are based on the principle of SSFLC technology the smectic layers are arranged perpendicularly to the plates of the cell. The helical arrangement of the tilt directions of the molecules is suppressed by a very small spacing of the plates (approx. 1-2 μm). As a result the longitudinal axes of the molecules are forced to arrange themselves in a plane parallel to the plates of the cell, as a result of which two distinct tilt orientations are produced. By applying a suitable alternating electric field it is possible to switch back and forth between these two states in the liquid-crystalline phase which exhibits a spontaneous polarization. Said switching process is substantially faster than in the case of conventional twisted cells (TN LCDs) which are based on nematic liquid crystals.

A considerable disadvantage for many applications of the materials at present available with chiral tilted smectic phases (such as, for example, Sc.) is that the dielectric anisotropy has values greater than zero or, if negative, values only slightly different from zero. Negative values of the dielectric anisotropy are necessary if the necessary planar orientation is produced by superimposing an AC holding field with low amplitude on the drive field (J. M. Geary, SID Conference, Orlando/Fla., April/May 1985, Paper 8.3). The use of materials with strongly negative dielectric anisotropy generally leads to a strong decrease in the spontaneous polarization and/or to unfavorable values for pitch and/or tilt. In addition, the temperature range of the ferroelectric phases is generally restricted in an unfavorable manner.

SUMMARY OF THE INVENTION

It has now been found that the use of compounds of formula II as components of chiral tilted smectic mixtures may substantially reduce the disadvantages mentioned. The compounds of the formula II are therefore excellently suitable as components of chiral tilted smectic liquid-crystalline phases. In particular, chemically especially stable chiral tilted smectic liquid-crystalline phases with favorable ferroelectric phase ranges, in particular with broad Sc* phase ranges, negative dielectric anisotropy, favorable pitch height and values of spontaneous polarization which are high for such phases can be prepared with their aid. P is the spontaneous polarization in nC/cm$^2$.

The compounds of formula II have a wide field of application. Depending on the choice of substituents, said compounds may serve as basic materials of which liquid-crystalline smectic phases are predominantly composed; compounds of formula II can, however, also have added to them liquid-crystalline basic materials from other compound classes, in order, for example, to vary the dielectric and/or optical anisotropy and/or the viscosity and/or the spontaneous polarization and/or the phase range and/or the tilt angle and/or the pitch of such a dielectric. The subject of the invention is thus formed by the compounds of the formula II and also their use as components of (chiral tilted) smectic liquid-crystalline phases. The subject of the invention is further formed by smectic liquid-crystalline phases, in particular chiral tilted smectic phases, with a content of at least one compound of formula I and also liquid-crystalline display elements, in particular electrooptical display elements which contain such phases.

The compounds of formula II may have straight-chain or branched wing groups $R^1$ and/or $R^2$. Compounds having branched wing groups may be used in the form of the racemate or as optically active compounds. Achiral basic mixtures consisting of compounds of formula II and optionally further achiral components may be doped with chiral compounds of formula II or also with other chiral compounds in order to obtain chiral tilted smectic phases.

The compounds of the formula II preferably contain a group of the formula (A)

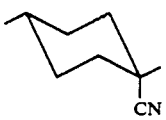 (A)

or the mirror image thereof in the specified configuration with axial nitrile group and trans-position of the substituents.

In the compounds of the formulae above and below $R^1$ and $R^2$ preferably denote R—, R—O—, R—O—CO—, R—O—COO— or R—CO—O—. R is preferably an alkyl group containing preferably 5 to 12 C atoms, wherein one or two non-terminal $CH_2$ groups may also be replaced by —O—, —O—CO—, —CH—CN—, —CH—halogen, —CHCH$_3$—O—, CH—halogen—COO—, —CHCN—COO—and/or —CH=CH—. R denotes, for example, preferably pentyl, hexyl, heptyl, octyl, nonyl, decyl, undecyl or dodecyl, also methyl, ethyl, propyl, butyl, 2-, 3- or 4-oxapentyl, 2-, 3-, 4-or 5-oxahexyl, 2-, 3-, 4-, 5- or 6-oxaheptyl, 2-, 3-, 4-, 5-, 6- or 7-oxaoctyl, 2-, 3-, 4- 5-, 6-, 7- or 8-oxanonyl, 2-, 3-, 4-, 5-, 6-, 7-, 8- or 9-o-xadeyl, 1,3-dioxabutyl (=methoxymethoxy), 1,3-, 1,4- or 2,4-dioxapentyl, 1,3-, 1,4-, 1,5-, 2,4-, 2,5- or 3,5-dioxahexyl, 1,3-, 1,4-, 1,5-, 1,6-, 2,4-, 2,5-, 2,6-, 3,5-, 3,6- or 4,6-dioxaheptyl, 1,4-dioxaoctyl, 1,4,7-trioxaoctyl, 1,4-dioxanonyl or 1,4dioxadecyl.

Compounds of formula II and also of the partial formulae above and below with branched wing groups $R^1$ or $R^2$ may occasionally be of importance because of a better solubility in the usual liquid-crystalline basic materials, in particular, however, as chiral dopants for chiral tilted smectic phases if they are optically active. Such compounds are suitable, however, also as components of nematic liquid-crystalline phases, in particular to prevent reverse twist. Branched groups of this type as a rule contain one or two chain branches. Preferably the asymmetric carbon atom is linked to two differently substituted C atoms, an H atom and a substituent chosen from the group consisting of halogen (in particular F, Cl or Br), alkyl or alkoxy containing in each case 1 to 5 C atoms and CN. The optically active organic radical $R^1$ or $R^2$ preferably has the formula

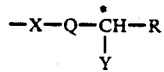

wherein
X denotes —CO—O—, —O—CO—, —O—CO—O—, —CO—, —O—, —S—, —CH=CH—, —CH=CH—COO—or a single bond,
Q denotes alkylene containing 1 to 5 C atoms, wherein a $CH_2$ group not linked to X may also be replaced by —O—, —CO—, —O—CO—, —CO—O— or —CH=CH—, or a single bond,
Y denotes CN, halogen, methyl or methoxy, and
R denotes an alkyl group differing from Y and containing 1 to 18 C atoms, wherein one or two non-adjacent $CH_2$ groups may also be replaced by —O—, —CO—, —O——CO—, —CO—O— and/or —CH=CH—.
X is preferably —CO—O—, —O—CO—, —CH=CH—COO—(trans) or a single bond. Especially preferred are —CO—O— and —O—CO—.
Q is preferably —CH$_2$—, —CH$_2$CH$_2$— or a single bond, a single bond being preferred in particular.

Y is preferably $CH_3$, —CN or Cl, —CN being preferred in particular.
R is preferably straight-chain alkyl containing 1 to 10, in particular containing 1 to 7, C atoms.
Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, 2-octyl, isopropoxy, 2-methylpropoxy, 2-methylbutoxy, 3-methylbutoxy, 2-methylpentoxy, 3-methylpentoxy, 2-ethylhexoxy, 1-methylhexoxy, 1-methylheptoxy, 2-oxa-3-methylbutyl, 3-oxa-4-methylpentyl, 2-octyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl.

Z is preferably —CO—O—, —O—CO—, —CH$_2$O—, —O—CH$_2$—, —CH$_2$CH$_2$—or a single bond. A is preferably 1,4—cyclohexylene substituted in position 1 or position 4 by CN, in particular Z—A—$R^2$, preferably being a group of the formula

$R^2$ is preferably straight-chain alkyl or straight-chain alkyl in which one or two $CH_2$ groups are replaced by —CHCH$_3$—, containing, preferably, 2 to 10 C atoms. If A denotes unsubstituted 1,4-cyclohexylene (preferably trans1,4-cyclohexylene), Z is preferably —CH$_2$—CH-CN— or, in particular, $R^2$ is an alkyl group containing 2 to 15 C atoms in which a $CH_2$ group is replaced by —CHCN—. In this case, $R^2$ is preferably a group of the formula —(CH$_2$)$_p$—CHCN—alkyl in which p is 0, 1 or 2 and alkyl is a straight-chain alkyl group containing (14-p) C atoms.

Of the compounds of formula II and also of the partial formulae above and below those are preferred in which at least one of the radicals contained therein has one of the specified preferred meanings.

The compounds of formula II have a high chemical stability. They are colorless and are readily miscible with all the usual liquid crystals. Their use in liquid crystalline phases leads to wider mesophase ranges and improved values for the spontaneous polarization in the chiral tilted smectic phases. The phases according to the invention are therefore very well suited as liquid crystalline phases for displays which are based on the principle of SSFLC technology. They are furthermore also suitable, however, for other electrooptical display devices, such as, for example, TN cells or guest/host cells. Here, in addition to extending the mesophase range, they serve in particular to establish negative values for the dielectric anisotropy and to improve the elastic constants.

Ar is preferably a group of the formula a to j:

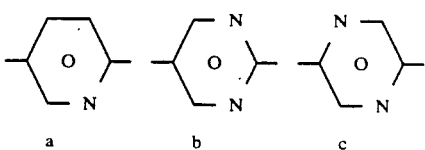

a       b       c

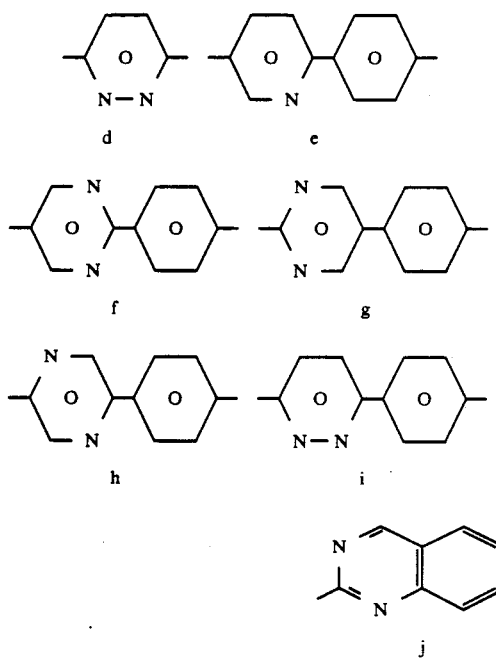

Groups of the formulae a, b, c, e, f, g and h are preferred. Especially preferred are e and f.

The compounds of the formula II may, for example, be obtained by reacting corresponding cyclohexanecarbonitriles (formula II, $R^2$=H) with a halide of the formula $R^2$-halogen.

The nitrile is expediently first converted to the corresponding carbanion with a strong base such as NaH, $NaNH_2$, lithium diisopropylamide, lithium piperidide or lithium 2,5-diisopropylpiperidide or potassium tert-butylate, preferably in an inert solvent, for example a hydrocarbon such as toluene, an ether such as THF or dioxane, an amide such as DMF, a sulfoxide such as dimethylsulfoxide or a mixture of such solvents. After adding $R^2$-halogen the temperature is exoediently held for 0.5 to 16 hours at temperatures between 0° and 150°.

The halides may be obtained, for example, from the corresponding alcohols. The halogen is preferably bromine or iodine.

The phases according to the invention contain preferably at least three, in particular at least five compounds of formula II. Especially preferred are chiral tilted smectic liquid-crystalline phases, according to the invention, whose achiral basic mixture contains, in addition to compounds of formula II, at least one other component with negative dielectric anisotropy or positive dielectric anisotropy which is small in value. This (these) other component(s) of the chiral basic mixture may make up 1 to 50%, preferably 10 to 25%, of the basic mixture. As further components with positive dielectric anisotropy which is small in value or negative dielectric anisotropy, compounds of the partial formulae Va to Vp are suitable:

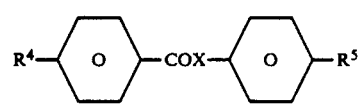

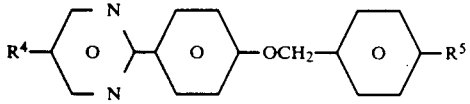

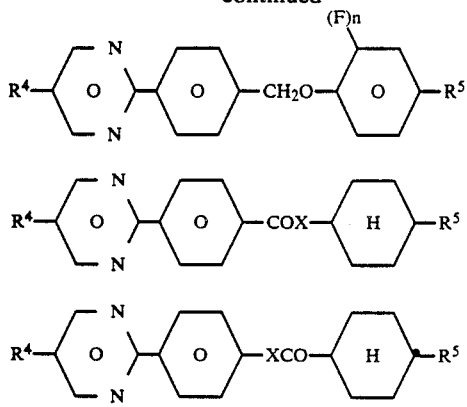

$R^4$ and $R^5$ are in each case preferably straight-chain alkyl, alkoxy, alkanoyloxy or alkoxycarbonyl, each containing 3 to 12 C atoms. X is preferably 0. n is 0 or 1.

Especially preferred are the compounds of the partial formulae Va, Vb, Vd and Vf, wherein $R^4$ and $R^5$ each denote straight-chain alkyl or alkoxy, each containing 5 to 10 C atoms.

The compounds of partial formula Vc, Vh and Vi are suitable as additives for lowering the melting point and are normally added to the basic mixtures in an amount of not more than 5%, preferably 1 to 3%. In the compounds of the partial formulae Vc, Vh and Vi $R^4$ and $R^5$ preferably denote straight-chain alkyl containing 2 to 7, preferably 3 to 5, C atoms. A further compound class suitable for lowering the melting point in the phases according to the invention is that of the formula

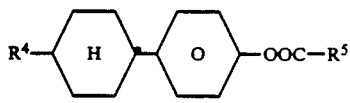

wherein $R^4$ and $R^5$ have the preferred meaning specified for Vc, Vh and Vi.

In addition, compounds containing the structural element B or C are suitable as further components with negative dielectric anisotropy.

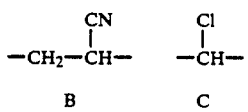

Preferred compounds of this type correspond to the formulae VIb and VIc:

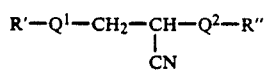

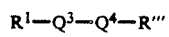

R' and R'' each denote preferably straight-chain alkyl or alkoxy groups, each containing 2 to 10 C atoms. $Q^1$ and $Q^2$ each denote 1,4-phenylene, trans-1,4-cyclohexylene, 4,4'-biphenylyl, 4-(trans-4-cyclohexyl)phenyl, trans, trans-4,4'-bicyclohexyl or one of the groups $Q^1$ and $Q^2$ also denotes a single bond.

$Q^3$ and $Q^4$ each denote 1,4-phenylene, 4,4'-biphenylyl or trans-1,4-cyclohexylene. One of the groups $Q^3$ and $Q^4$ may also denote 1,4-phenylene, wherein at least one CH group is replaced by N. R''' is an optically active radical with an asymmetric carbon atom of the structure

or

Especially preferred compounds of the formula VIc are those of the formula VIc':

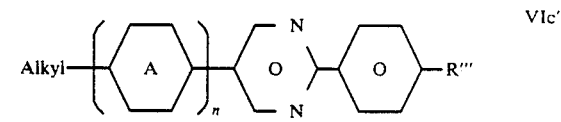

wherein A denotes 1,4-phenylene or trans-1,4-cyclohexylene and n denotes 0 or 1.

The preparation of the phases according to the invention is carried out in a manner usual per se. As a rule, the components are dissolved in each other, expediently at elevated temperature.

By means of suitable, additions, the liquid-crystal-line phases according to the invention may be modified in a manner such that they can be used in all the types of liquid-crystalline display elements disclosed hitherto.

The following examples are intended to illustrate the invention without limiting it. Above and below the percentage figures denote percent by weight; all the temperatures are specified in degrees Celsius. In addition, K=crystalline/solid state, S=smectic phase (the index denotes the type of phase), N=nematic state, Ch=chlesteric phase, I=isotropic phase. The number between the two symbols specifies the transition temperature in degrees Celsius. "Usual working up" means that water is added, extraction is carried out with methylene chloride, separation is carried out, the organic phase is dried and evaporated down, and the product is purified by crystallization and/or chromatography.

EXAMPLES

Example 1

With moisture excluded and under an atmosphere of nitrogen at −10° C. 62.5 ml of a 1.6 M solution of N-butyl lithium in hexane and 36.1 g of trans-4-[5-(p-n-heptylphenyl)-2-pyrimidinyl]cyclohexanecarbonitrile (European Published Application 0,014,885) in 50 ml of THF are consecutively added dropwise to 10.1 g of diisopropylamine in 70M (sic) of THF. The reaction mixture is then stirred for 20 minutes, likewise at −10° C. 16.6 g of 1bromopentane are subsequently added and stirring is then carried out for 20 minutes at room temperature. The reaction mixture is worked up as usual and the product purified by chromatography and crystallization. r-1-Cyano1-n-pentyl-cis-4-[5-(p-n-heptylphenyl)-2-pyrimidinyl]cyclohexane is obtained.

The following are prepared analogously:
r-1-cyano-1-propyl-cis-4-[5-(p-heptylphenyl)-2-pyrimidinyl]cyclohexane r-1-cyano-1-butyl-cis-4-[5-(p-heptylphenyl)-2-pyrimidinyl]cyclohexane
r-1-cyano-1-hexyl-cis-4-[5-(p-heptylphenyl)-2-pyrimidinyl]cyclohexane
r-1-cyano-1-heptyl-cis-4-[5-(p-heptylphenyl)-2-pyrimidinyl]cyclohexane
r-1-cyano-octyl-cis-4-[5-(p-heptylphenyl)-2-pyrimidinyl]cyclohexane
r-1-cyano-1-nonyl-cis-4-[5-(p-heptylphenyl)-2-pyrimidinyl]cyclohexane
r-1-cyano-1-decyl-cis-4-[5-(p-heptylphenyl)-2-pyrimidinyl]cyclohexane
r-1-cyano-1-propyl-cis-4-[5-(p-octylphenyl)-2-pyrimidinyl]cyclohexane
r-1-cyano-1-butyl-cis-4-[5-(p-octylphenyl)-2-pyrimidinyl]cyclohexane
r-1-cyano-1-pentyl-cis-4-[5-(p-octylphenyl)-2-pyrimidinyl]cyclohexane
r-1-cyano-1-hexyl-cis-4-[5-(p-octylphenyl)-2-pyrimidinyl]cyclohexane
r-1-cyano-1-heptyl-cis-4-[5-(p-octylphenyl)-2-pyrimidinyl]cyclohexane
r-1-cyano-1-octyl-cis-4-[5-(p-octylphenyl)-2-pyrimidinyl]cyclohexane
r-1-cyano-1-nonyl-cis-4-[5-(p-octylphenyl)-2-pyrimidinyl]cyclohexane
r-1-cyano-1-decyl-cis-4-[5-(p-octylphenyl)-2-pyrimidinyl]cyclohexane
r-1-cyano-1-propyl-cis-4-[5-(p-nonylphenyl)-2-pyrimidinyl]cyclohexane
r-1-cyano-1-butyl-cis-4-[5-(p-nonylphenyl)-2-pyrimidinyl]cyclohexane
r-1-cyano-1-hexyl-cis-4-[5-(p-nonylphenyl)-2-pyrimidinyl]cyclohexane
r-1-cyano-1-heptyl-cis-4-[5-(p-nonylphenyl)-2-pyrimidinyl]cyclohexane
r-1-cyano-1-octyl-cis-4-[5-(p-nonylphenyl)-2-pyrimidinyl]cyclohexane
r-1-cyano-1-nonyl-cis-4-[5-(p-nonylphenyl)-2-pyrimidinyl]cyclohexane
r-1-cyano-1-decyl-cis-4-[5-(p-nonylphenyl)-2-pyrimidinyl]cyclohexane
r-1-cyano-1-propyl-cis-4-[5-(p-decylphenyl)-2-pyrimidinyl]cyclohexane
r-1-cyano-1-butyl-cis-4-[5-(p-decylphenyl)-2-pyrimidinyl]cyclohexane
r-1-cyano-1-hexyl-cis-4-[5-(p-decylphenyl)-2-pyrimidinyl]cyclohexane
r-1-cyano-1-heptyl-cis-4-[5-(p-decylphenyl)-2-pyrimidinyl]cyclohexane
r-1-cyano-1-octyl-cis-4-[5-(p-decylphenyl)-2-pyrimidinyl]cyclohexane
r-1-cyano-1-nonyl-cis-4-[5-(p-decylphenyl)-2-pyrimidinyl]cyclohexane
r-1-cyano-1-decyl-cis-4-[5-(p-decylphenyl)-2-pyrimidinyl]cyclohexane Example 2

34.7 g of p-(4-n-hexyl-4-cyanocyclohexyl)benzamidine hydrochloride and 20.4 g of 2-n-pentyl-3-ethoxyacrolein are added to a solution of 4.6 g of sodium in 150 ml of methanol (analogously to A. Villiger, A. Boller, M. Schadt, Z. Naturforsch. 34b, 1535, 1979), stirring is carried out for 12 hours under a nitrogen atmosphere, acidification is carried out with 3 N HCl and the working up is carried out in the usual manner. r-1-Cyano-1-n-hexyl-cis4-[p-(5-n-pentylpyrimidin-2-yl)phenyl]cyclohexane is obtained.

The following were obtained analogously:
r-1-cyano-1-hexyl-cis-4-[p-(5-butylpyrimidin-2-yl)phenyl]cyclohexane,
r-1-cyano-1-hexyl-cis-4-[p-(5-hexylpyrimidin-2-yl)phenyl]cyclohexane,
r-1-cyano-1-hexyl-cis-4-[p-(5-heptylpyrimidin-2-yl)phenyl]cyclohexane,
r-1-cyano-1-hexyl-cis-4-[p-(5-octylpyrimidin-2-yl)phenyl]cyclohexane,
r-1-cyano-1-hexyl-cis-4-[p-(5-nonylpyrimidin-2-yl)phenyl]cyclohexane,
r-1-cyano-1-pentyl-cis-4-[p-(5-butylpyrimidin-2-yl)phenyl]cyclohexane,
r-1-cyano-1-pentyl-cis-4-[p-(5-pentylpyrimidin-2-yl)phenyl]cyclohexane,
r-1-cyano-1-pentyl-cis-4-[p-(5-hexylpyrimidin-2-yl)phenyl]cyclohexane,
r-1-cyano-1-pentyl-cis-4-[P-(5-heptylpyrimidin-2-yl)phenyl]cyclohexane,
r-1-cyano-1-pentyl-cis-4-[p-(5-octylpyrimidin-2-yl)phenyl]cyclohexane,
r-1-cyano-1-pentyl-cis-4-[p-(5-nonylpyrimidin-2-yl)phenyl]cyclohexane,
r-1-cyano-1-pentyl-cis-4-[p-(5-decylpyrimidin-2-yl)phenyl]cyclohexane,
r-1-cyano-1-heptyl-cis-4-[p-(5-propylpyrimidin-2-yl)phenyl]cyclohexane, m.p. 94°o, c.p. 143°
r-1-cyano-1-heptyl-cis-4-[p-(5-butylpyrimidin-2-yl)phenyl]cyclohexane,
r-1-cyano-1-heptyl-cis-4-[p-(5-pentylpyrimidin-2-yl)phenyl]cyclohexane,
r-1-cyano-1-heptyl-cis-4-[p-(5-hexylpyrimidin-2-yl)phenyl]cyclohexane,
r-1-cyano-1-heptyl-cis-4-[p-(5-heptylpyrimidin-2-yl)phenyl]cyclohexane, m.p. 101°, c.p. 126°
r-1-cyano-1-heptyl-cis-4-[p-(5-octylpyrimidin-2-yl)phenyl]cyclohexane,
r-1-cyano-1-heptyl-cis-4-[p-(5-nonylpyrimidin-2-yl)phenyl]cyclohexane,
r-1-cyano-1-heptyl-cis-4-[p-(5-decylpyrimidin-2-yl)phenyl]cyclohexane,
r-1-cyano-1-octyl-cis-4-[p-(5-butylpyrimidin-2-yl)phenyl]cyclohexane,
r-1-cyano-1-octyl-cis-4-[p-(5-pentylpyrimidin-2-yl)phenyl]cyclohexane,
r-1-cyano-1-octyl-cis-4-[p-(5-hexylpyrimidin-2-yl)phenyl]cyclohexane,
r-1-cyano-1-octyl-cis-4-[p-(5-heptylpyrimidin-2-yl)phenyl]cyclohexane,
r-1-cyano-1-octyl-cis-4-[p-(5-octylpyrimidin-2-yl)phenyl]cyclohexane,
r-1-cyano-1-octyl-cis-4-[p-(5-nonylpyrimidin-2-yl)phenyl]cyclohexane,
r-1-cyano-1-octyl-cis-4-[p-(5-decylpyrimidin-2-yl)phenyl]cyclohexane,
r-1-cyano-1-nonyl-cis-4-[p-(5-butylpyrimidin-2-yl)phenyl]cyclohexane,
r-1-cyano-1-nonyl-cis-4-[p-(5-pentylpyrimidin-2-yl)phenyl]cyclohexane,
r-1-cyano-1-nonyl-cis-4-[p-(5-hexylpyrimidin-2-yl)phenyl]cyclohexane,
r-1-cyano-1-nonyl-cis-4-[p-(5-heptylpyrimidin-2-yl)phenyl]cyclohexane,
r-1-cyano-1-nonyl-cis-4-[p-(5-octylpyrimidin-2-yl)phenyl]cyclohexane,
r-1-cyano-1-nonyl-cis-4-[p-(5-nonylpyrimidin-2-yl)phenyl]cyclohexane, r-1-cyano-1-nonyl-cis-4-[p-(5-decylpyrimidin-2-yl)-
phenyl]cyclohexane,
r-1-cyano-1-decyl-cis-4-[p-(5-butylpyrimidin-2-yl)-
phenyl]cyclohexane,
r-1-cyano-1-decyl-cis-4-[p-(5-pentylpyrimidin-2-yl)-
phenyl]cyclohexane,
r-1-cyano-1-decyl-cis-4-[p-(5-hexylpyrimidin-2-yl)-
phenyl]cyclohexane,
r-1-cyano-1-decyl-cis-4-[p-(5-heptylpyrimidin-2-yl)-
phenyl]cyclohexane,
r-1-cyano-1-decyl-cis-4-[p-(5-octylpyrimidin-2-yl)-
phenyl]cyclohexane,
r-1-cyano-1-decyl-cis-4-[p-(5-nonylpyrimidin-2-yl)-
phenyl]cyclohexane,
r-1-cyano-1-decyl-cis-4-[p-(5-decylpyrimidin-2-yl)-
phenyl]cyclohexane,
r-1-cyano-1-butyl-cis-4-[p-(5-butylpyrimidin-2-yl)-
phenyl]cyclohexane,
r-1-cyano-1-butyl-cis-4-[p-(5-pentylpyrimidin-2-yl)-
phenyl]cyclohexane,
r-1-cyano-1-butyl-cis-4-[p-(5-hexylpyrimidin-2-yl)-
phenyl]cyclohexane,
r-1-cyano-1-butyl-cis-4-[p-(5-heptylpyrimidin-2-yl)-
phenyl]cyclohexane,
r-1-cyano-1-butyl-cis-4-[p-(5-octylpyrimidin-2-yl)-
phenyl]cyclohexane,
r-1-cyano-1-butyl-cis-4-[p-(5-nonylpyrimidin-2-yl)-
phenyl]cyclohexane,
r-1-cyano-1-butyl-cis-4-[p-(5-decylpyrimidin-2-yl)-
phenyl]cyclohexane,
r-1-cyano-1-pentyl-cis-4-[p-(5-butylpyrimidin-2-yl)-
phenyl]cyclohexane,
r-1-cyano-1-pentyl-cis-4-[p-(5-pentylpyrimidin-2-yl)-
phenyl]cyclohexane,
r-1-cyano-1-pentyl-cis-4-[p-(5-hexylpyrimidin-2-yl)-
phenyl]cyclohexane,
r-1-cyano-1-pentyl-cis-4-[p-(5-heptylpyrimidin-2-yl)-
phenyl]cyclohexane,
r-1-cyano-1-pentyl-cis-4-[p-(5-octylpyrimidin-2-yl)-
phenyl]cyclohexane,
r-1-cyano-1-pentyl-cis-4-[p-(5-nonylpyrimidin-2-yl)-
phenyl]cyclohexane,
r-1-cyano-1-pentyl-cis-4-[p-(5-decylpyrimidin-2-yl)-
phenyl]cyclohexane
r-1-cyano-1-hexyl-cis-4-[p-(5-butylpyrimidin-2-yl)-
phenyl]cyclohexane,
r-1-cyano-1-hexyl-cis-4-[p-(5-pentylpyrimidin-2-yl)-
phenyl]cyclohexane,
r-1-cyano-1-hexyl-cis-4-[p-(5-hexylpyrimidin-2-yl)-
phenyl]cyclohexane,
r-1-cyano-1-hexyl-cis-4-[p-(5-heptylpyrimidin-2-yl)-
phenyl]cyclohexane,
r-1-cyano-1-hexyl-cis-4-[p-(5-octylpyrimidin-2-yl)-
phenyl]cyclohexane,
r-1-cyano-1-hexyl-cis-4-[p-(5-nonylpyrimidin-2-yl)-
phenyl]cyclohexane,
r-1-cyano-1-hexyl-cis-4-[p-(5-decylpyrimidin-2-yl)-
phenyl]cyclohexane,
r-1-cyano-1-heptyl-cis-4-[p-(5-butylpyrimidin-2-yl)-
phenyl]cyclohexane,
r-1-cyano-1-heptyl-cis-4-[p-(5-pentylpyrimidin-2-yl)-
phenyl]cyclohexane,
r-1-cyano-1-heptyl-cis-4-[p-(5-hexylpyrimidin-2-yl)-
phenyl]cyclohexane,
r-1-cyano-1-heptyl-cis-4-[p-(5-heptylpyrimidin-2-yl)-
phenyl]cyclohexane,
r-1-cyano-1-heptyl-cis-4-[p-(5-octylpyrimidin-2-yl)-
phenyl]cyclohexane,
r-1-cyano-1-heptyl-cis-4-[p-(5-nonylpyrimidin-2-yl)-
phenyl]cyclohexane,
r-1-cyano-1-heptyl-cis-4-[p-(5-decylpyrimidin-2-yl)-
phenyl]cyclohexane,
r-1-cyano-1-octyl-cis-4-[p-(5-butylpyrimidin-2-yl)-
phenyl]cyclohexane,
r-1-cyano-1-octyl-cis-4-[p-(5-pentylpyrimidin-2-yl)-
phenyl]cyclohexane,
r-1-cyano-1-octyl-cis-4-[p-(5-hexylpyrimidin-2-yl)-
phenyl]cyclohexane,
r-1-cyano-1-octyl-cis-4-[p-(5-heptylpyrimidin-2-yl)-
phenyl]cyclohexane,
r-1-cyano-1-octyl-cis-4-[p-(5-octylpyrimidin-2-yl)-
phenyl]cyclohexane,
r-1-cyano-1-octyl-cis-4-[p-(5-nonylpyrimidin-2-yl)-
phenyl]cyclohexane,
r-1-cyano-1-octyl-cis-4-[p-(5-decylpyrimidin-2-yl)-
phenyl]cyclohexane,
r-1-cyano-1-nonyl-cis-4-[p-(5-butylpyrimidin-2-yl)-
phenyl]cyclohexane,
r-1-cyano-1-nonyl-cis-4-[p-(5-pentylpyrimidin-2-yl)-
phenyl]cyclohexane,
r-1-cyano-1-nonyl-cis-4-[p-(5-hexylpyrimidin-2-yl)-
phenyl]cyclohexane,
r-1-cyano-1-nonyl-cis-4-[P-(5-heptylpyrimidin-2-yl)-
phenyl]cyclohexane,
r-1-cyano-1-nonyl-cis-4-[p-(5-octylpyrimidin-2-yl)-
phenyl]cyclohexane,
r-1-cyano-1-nonyl-cis-4-[p-(5-nonylpyrimidin-2-yl)-
phenyl]cyclohexane,
r-1-cyano-1-nonyl-cis-4-[p-(5-decylpyrimidin-2-yl)-
phenyl]cyclohexane,
r-1-cyano-1-butyl-cis-4-[p-(5-(trans-4-butylcyclohexyl)-
pyrimidin-2-yl)phenyl]cyclohexane,
r-1-cyano-1-butyl-cis-4-[p-(5-(trans-4-pentylcyclohex-
yl)pyrimidin-2-yl)phenyl]cyclohexane,
r-1-cyano-1-butyl-cis-4-[p-(5-(trans-4-hexylcyclohexyl)-
pyrimidin-2-yl)phenyl]cyclohexane,
r-1-cyano-1-butyl-cis-4-[p-(5-(trans-4-heptylcyclohex-
yl)pyrimidin-2-yl)phenyl]cyclohexane,
r-1-cyano-1-butyl-cis-4-[p-(5-(trans-4-octylcyclohexyl)-
pyrimidin-2-yl)phenyl]cyclohexane,
r-1-cyano-1-butyl-cis-4-[p-(5-(trans-4-nonylcyclohex-
yl)pyrimidin-2-yl)phenyl]cyclohexane,
r-1-cyano-1-butyl-cis-4-[p-(5-(trans-4-decylcyclohexyl)-
pyrimidin-2-yl)phenyl]cyclohexane,
r-1-cyano-1-pentyl-cis-4-[p-(5-(trans-4-butylcyclohex-
yl)pyrimidin-2-yl)phenyl]cyclohexane,
r-1-cyano-1-pentyl-cis-4-[p-(5-(trans-4-pentylcyclohex-
yl)pyrimidin-2-yl)phenyl]cyclohexane,
r-1-cyano-1-pentyl-cis-4-[p-(5-(trans-4-hexylcyclohex-
yl)pyrimidin-2-yl)phenyl]cyclohexane,
r-1-cyano-1-pentyl-cis-4-[p-(5-(trans-4-heptylcyclohex-
yl)pyrimidin-2-yl)phenyl]cyclohexane,
r-1-cyano-1-pentyl-cis-4-[p-(5-(trans-4-octylcyclohex-
yl)pyrimidin-2-yl)phenyl]cyclohexane,
r-1-cyano-1-pentyl-cis-4-[p-(5-(trans-4-nonylcyclohex-
yl)pyrimidin-2-yl)phenyl]cyclohexane,
r-1-cyano-1-pentyl-cis-4-[p-(5-(trans-4-decylcyclohex-
yl)pyrimidin-2-yl)phenyl]cyclohexane,
r-1-cyano-1-hexyl-cis-4-[p-(5-(trans-4-butylcyclohexyl)-
pyrimidin-2-yl)phenyl]cyclohexane,
r-1-cyano-1-hexyl-cis-4-[p-(5-(trans-4-pentylcyclohex-
yl)pyrimidin-2-yl)phenyl]cyclohexane,
r-1-cyano-1-hexyl-cis-4-[p-(5-(trans-4-hexylcyclohex-
yl)pyrimidin-2-yl)phenyl]cyclohexane,
r-1-cyano-1-hexyl-cis-4-[p-(5-(trans-4-heptylcyclohex-
yl)pyrimidin-2-yl)phenyl]cyclohexane, r-1-cyano-1-hexyl-cis-4-[p-(5-(trans-4-octylcyclohexyl)-pyrimidin-2-yl)phenyl]cyclohexane,
r-1-cyano-1-hexyl-cis-4-[p-(5-(trans-4-nonylcyclohexyl)pyrimidin-2-yl)phenyl]cyclohexane,
r-1-cyano-1-hexyl-cis-4-[p-(5-(trans-4-decylcyclohexyl)pyrimidin-2-yl)phenyl]cyclohexane,
r-1-cyano-1-heptyl-cis-4-[p-(5-(trans-4-butylcyclohexyl)pyrimidin-2-yl)phenyl]cyclohexane,
r-1-cyano-1-heptyl-cis-4-[p-(5-(trans-4-pentylcyclohexyl)pyrimidin-2-yl)phenyl]cyclohexane,
r-1-cyano-1-heptyl-cis-4-[p-(5-(trans-4-hexylcyclohexyl)pyrimidin-2-yl)phenyl]cyclohexane,
r-1-cyano-1-heptyl-cis-4-[p-(5-(trans-4-heptylcyclohexyl)pyrimidin-2-yl)phenyl]cyclohexane,
r-1-cyano-1-heptyl-cis-4-[p-(5-(trans-4-nonylcyclohexyl)pyrimidin-2-yl)phenyl]cyclohexane,
r-1-cyano-1-heptyl-cis-4-[p-(5-(trans-4-decylcyclohexyl)pyrimidin-2-yl)phenyl]cyclohexane,
r-1-cyano-1-octyl-cis-4-[p-(5-(trans-4-butylcyclohexyl)pyrimidin-2-yl)phenyl]cyclohexane,
r-1-cyano-1-octyl-cis-4-[p-(5-(trans-4-pentylcyclohexyl)pyrimidin-2-yl)phenyl]cyclohexane,
r-1-cyano-1-octyl-cis-4-[p-(5-(trans-4-hexylcyclohexyl)pyrimidin-2-yl)phenyl]cyclohexane,
r-1-cyano-1-octyl-cis-4-[p-(5-(trans-4-heptylcyclohexyl)pyrimidin-2-yl)phenyl]cyclohexane,
r-1-cyano-1-octyl-cis-4-[p-(5-(trans-4-octylcyclohexyl)pyrimidin-2-yl)phenyl]cyclohexane,
r-1-cyano-1-octyl-cis-4-[p-(5-(trans-4-nonylcyclohexyl)pyrimidin-2-yl)phenyl]cyclohexane,
r-1-cyano-1-octyl-cis-4-[p-(5-(trans-4-decylcyclohexyl)pyrimidin-2-yl)phenyl]cyclohexane,
r-1-cyano-1-nonyl-cis-4-[p-(5-(trans-4-butylcyclohexyl)pyrimidin-2-yl)phenyl]cyclohexane,
r-1-cyano-1-nonyl-cis-4-[p-(5-(trans-4-pentylcyclohexyl)pyrimidin-2-yl)phenyl]cyclohexane,
r-1-cyano-1-nonyl-cis-4-[p-(5-(trans-4-hexylcyclohexyl)pyrimidin-2-yl)phenyl]cyclohexane,
r-1-cyano-1-nonyl-cis-4-[p-(5-(trans-4-heptylcyclohexyl)pyrimidin-2-yl)phenyl]cyclohexane,
r-1-cyano-1-nonyl-cis-4-[p-(5-(trans-4-octylcyclohexyl)pyrimidin-2-yl)phenyl]cyclohexane,
r-1-cyano-1-nonyl-cis-4-[p-(5-(trans-4-nonylcyclohexyl)pyrimidin-2-yl)phenyl]cyclohexane,
r-1-cyano-1-nonyl-cis-4-[p-(5-(trans-4-decylcyclohexyl)pyrimidin-2-yl)phenyl]cyclohexane

Example 3

A liquid-crystalline phase is prepared which consists of
4% 2-p-heptyloxyphenyl-5-heptylpyrimidine,
30% 2-p-undecyloxyphenyl-5-hexylpyrimidine,
30% 2-p-nonyloxyphenyl-5-nonylpyrimidine,
12% pentyl r-1-cyano-cis-4-[p-(5-heptylpyrimidin-2-yl)phenyl]cyclohexane-1-carboxylate,
14% butyl r-1-cyano-cis-4-[p-(5-octylpyrimidin-2-yl)phenyl]cyclohexane-1-carboxylate and
10% p-(5-hexylpyrimidin-2-yl)phenyl-2-chloropropionate (optically active).

Example 4

A liquid-crystalline phase is prepared which consists of
20% 4-(5-hexylpyrimidin-2-yl)phenyl-(p-pentylbenzyl) ether,
20% 4-(5-heptylpyrimidin-2-yl)phenyl-(p-hexylbenzyl) ether,
20% 4-(5-nonylpyrimidin-2-yl)phenyl-(p-propylbenzyl) ether,
5% 4-(5-nonylpyrimidin-2-yl)phenyl-(p-cyanobenzyl) ether,
10% butyl r-1-cyano-cis-4-[p-(5-heptylpyrimidin-2-yl)phenyl]cyclohexane-1-carboxylate,
15% pentyl r-1-cyano-cis-4-[p-(5-octylpyrimidin-2-yl)phenyl]cyclohexane-1-carboxylate, and
10% -(5-hexylpyrimidin-2-yl)phenyl-2-chloropropionate (optically active).

Example 5

A liquid-crystalline phase consisting of
3% 2-p-hexyloxyphenyl-5-heptylpyrimidine,
3% 2-p-heptyloxyphenyl-5-heptylpyrimidine,
3% 2-p-octyloxyphenyl-5-heptylpyrimidine,
3% 2-p-nonyloxyphenyl-5-heptylpyrimidine,
8% 2-p-hexyloxyphenyl-5-nonylpyrimidine,
25% 2-p-nonyloxyphenyl-5-nonylpyrimidine,
30% r-1-cyano-cis-4-(4'-octyloxybiphenyl-4-yl)-1-octylcyclohexane,
15% r-1-cyano-cis-4-(4'-nonanoyloxybiphenyl-4-yl)-1-butylcyclohexane and
10% r-1-cyano-cis-4-[p-(5-nonylpyrimidin-2-yl)phenyl]-1(2-methylbutyl)cyclohexane (optically active)
has K $-8°S_C^x$ 65° and $S_A^x$ and P=8 nC/cm$^2$ at 20°.

Example 6

A liquid-crystalline phase is prepared which consists
3% 2-p-hexyloxyphenyl-5-heptylpyrimidine,
3% 2-p-heptyloxyphenyl-5-heptylpyrimidine,
3% 2-p-octyloxyphenyl-5-heptylpyrimidine,
3% 2-p-nonyloxyphenyl-5-heptylpyrimidine,
8% 2-p-hexyloxyphenyl-5-nonylpyrimidine,
25% 2-p-nonyloxyphenyl-5-nonylpyrimidine,
20% 2r-1-cyano-1-(trans-4-octylcyclohexylethyl)-cis-4-(p-octyloxyphenyl)cyclohexane,
10% r-1-cyano-1-(trans-4-octylcyclohexylethyl)-cis-4-(p-heptyloxyphenyl)cyclohexane,
10% r-1-cyano-1-(trans-4-octylcyclohexylethyl)-cis-4-(p-octylphenyl)cyclohexane,
5% r-1-cyano-1-(trans-4-octylcyclohexylethyl)-cis-4-(p-heptylphenyl)cyclohexane,
10% r-1-cyano-cis-4-[p-(5-octylpyrimidin-2-yl)phenyl]-1-(2-methylbutyl)cyclohexane (optically active).

Example 7

A liquid-crystalline phase consisting of
3% 2-p-hexyloxyphenyl-5-heptylpyrimidine,
3% 2-p-heptyloxyphenyl-5-heptylpyrimidine,
3% 2-p-octyloxyphenyl-5-heptylpyrimidine,
3% 2-p-nonyloxyphenyl-5-heptylpyrimidine,
8% 2-p-hexyloxyphenyl-5-nonylpyrimidine,
25% 2-p-nonyloxyphenyl-5-nonylpyimidine,
30% r-1-cyano-cis-4-[p-(p-octyloxybenzoyloxy)-phenyl]-1-octylcyclohexane,
15% r-1-cyano-cis-4-[p-(p-octyloxybenzoyloxy)-phenyl]-1-pentylcyclohexane,
10% r-1-cyano-cis-4-[p-(5-nonyloxypyrimidin-2-yl)phenyl]-1-(2-methylbutyl)cyclohexane (optically active)
has K $-10°S_C^x$ 61°$S_A^x$ and P=10 nC/cm$^2$ at 20°.

Example 8

A liquid-crystalline phase is prepared which consists of
3% 2-p-hexyloxyphenyl-5-heptylpyrimidine,
3% 2-p-heptyloxyphenyl-5-heptylpyrimidine, 3% 2-p-octyloxyphenyl-5-heptylpyrimidine,
3% 2-p-nonyloxyphenyl-5-heptylpyrimidine,
8% 2-p-hexyloxyphenyl-5-nonylpyrimidine,
25% 2-p-nonyloxyphenyl-5-nonylpyrimidine,
25% 1-cyano-1-trans-4-(p-heptyloxyphenyl)cyclohexyl-2-(trans-4-octylcyclohexyl)ethane,
15% 1-cyano-1-trans-4-(p-octyloxyphenyl)cyclohexyl-2-(trans-4-octylcyclohexyl)ethane, 10% 1-cyano-1-trans-4-(p-octylphenyl)cyclohexyl-2-(trans-4-butylcyclohexyl)ethane,
5% 1-cyano-1-trans-4-(p-heptylphenyl)-cyclohexyl-2-(trans-4-butylcyclohexyl)ethane and
10% r-1-cyano-cis-4-[p-(5-octylpyrimidin-2-yl)phenyl]-1-(2-methylbutyl)cyclohexane.

Example 9

A liquid-crystalline phase is prepared which consists of
3% 2-p-hexyloxyphenyl-5-heptylpyrimidine,
3% 2-p-heptyloxyphenyl-5-heptylpyrimidine,
3% 2-p-octyloxyphenyl-5-heptylpyrimidine,
3% 2-p-nonyloxyphenyl-5-heptylpyrimidine,
8% 2-p-hexyloxyphenyl-5-nonylpyrimidine,
25% 2-p-nonyloxyphenyl-5-nonylpyrimidine,
10% r-1-cyano-cis-4-(p-octyloxyphenyl)-1-octylcyclohexane,
10% r-1-cyano-cis-4-(4'-octyloxycarbonylbiphenyl-4-yl)-1-octylcyclohexane,
5% r-1-cyano-cis-4-(p-heptyloxybenzoyloxy)-1-nonylcyclohexane,
10% r-1-cyano-cis-4-[p-(p-octylphenyl)benzoyloxy]-1-butylcyclohexane,
5% r-1-cyano-cis-4-[p-(p-octyloxyphenyl)benzoyloxy]-1-butylcyclohexane and
15% r-1-cyano-cis-4-(5-nonylpyrimidin-2-yl)phenoxycarbonyl]-1-(2-methylbutyl)cyclohexane (optically active).

Example 10

At 5 −10° and with moisture excluded, 2.8 g of dicyclohexylcarbodiimide in 50 ml of methylene chloride are added to a mixture of 3.2 g of 2-p-hydroxyphenyl-5-hexylpyrimidine, 3.15 g of 4-cyano-4-heptylcyclohexane carboxylic acid [obtainable from 4-cyanocyclohexanecarboxylic acid by reaction with n-heptylbromide in the presence of 2 equivalents of lithium diisopropylamide] and 150 mg of 4-N,N'-dimethylaminopyridine in 150 ml of dichloromethane, stirring is carried out for one hour at room temperature, the precipitated urea derivative is removed and the filtrate is worked up as usual. p-(5-Hexylpyrimidin-2-yl)phenyl r-1- cyano-1-heptylcyclohexane-cis-4-carboxylate is obtained.

The following are prepared analogously:
p-(5-propylpyrimidin-2-yl)phenyl r-1-cyano-1-heptylcyclohexane-cis-4-carboxylate
p-(5-butylpyrimidin-2-yl)phenyl r-1-cyano-1-heptylcyclohexane-cis-4-carboxylate
p-(5-pentylpyrimidin-2-yl)phenyl r-1-cyano-1-heptylcyclohexane-cis-4-carboxylate
p-(5-heptylpyrimidin-2-yl)phenyl r-1-cyano-1-heptylcyclohexane-cis-4-carboxylate
p-(5-octylpyrimidin-2-yl)phenyl r-1-cyano-1-heptylcyclohexane-cis-4-carboxylate
p-(5-nonylpyrimidin-2-yl)phenyl r-1-cyano-1-heptylcyclohexane-cis-4-carboxylate
p-(5-decylpyrimidin-2-yl)phenyl r-1-cyano-1-heptylcyclohexane-cis-4-carboxylate
p-(5-propylpyrimidin-2-yl)phenyl r-1-cyano-1-octylcyclohexane-cis-4-carboxylate
p-(5-butylpyrimidin-2-yl)phenyl r-1-cyano-1-octylcyclohexane-cis-4-carboxylate
p-(5-pentylpyrimidin-2-yl)phenyl r-1-cyano-1-octylcyclohexane-cis-4-carboxylate
p-(5-hexylpyrimidin-2-yl)phenyl r-1-cyano-1-octylcyclohexane-cis-4-carboxylate
p-(5-heptylpyrimidin-2-yl)phenyl r-1-cyano-1-octylcyclohexane-cis-4-carboxylate
p-(5-octylpyrimidin-2-yl)phenyl r-1-cyano-1-octylcyclohexane-cis-4-carboxylate
p-(5-nonylpyrimidin-2-yl)phenyl r-1-cyano-1-octylcyclohexane-cis-4-carboxylate
p-(5-decylpyrimidin-2-yl)phenyl r-1-cyano-1-octylcyclohexane-cis-4-carboxylate
p-(5-propylpyrimidin-2-yl)phenyl r-1-cyano-1-nonylcyclohexane-cis-4-carboxylate
p-(5-butylpyrimidin-2-yl)phenyl r-1-cyano-1-nonylcyclohexane-cis-4-carboxylate
p-(5-pentylpyrimidin-2-yl)phenyl r-1-cyano-1-nonylcyclohexane-cis-4-carboxylate
p-(5-hexylpyrimidin-2-yl)phenyl r-1-cyano-1-nonylcyclohexane-cis-4-carboxylate
p-(5-heptylpyrimidin-2-yl)phenyl r-1-cyano-1-nonylcyclohexane-cis-4-carboxylate
p-(5-octylpyrimidin-2-yl)phenyl r-1-cyano-1-nonylcyclohexane-cis-4-carboxylate
p-(5-nonylpyrimidin-2-yl)phenyl r-1-cyano-1-nonylcyclohexane-cis-4-carboxylate
p-(5-decylpyrimidin-2-yl)phenyl r-1-cyano-1-nonylcyclohexane-cis-4-carboxylate
p-(5-propylpyridin-2-yl)phenyl r-1-cyano-1-heptylcyclohexane-cis-4-carboxylate
p-(5-butylpyridin-2-yl)phenyl r-1-cyano-1-heptylcyclohexane-cis-4-carboxylate
p-(5-pentylpyridin-2-yl)phenyl r-1-cyano-1-heptylcyclohexane-cis-4-carboxylate
p-(5-hexylpyridin-2-yl)phenyl r-1-cyano-1-heptylcyclohexane-cis-4-carboxylate
p-(5-heptylpyridin-2-yl)phenyl r-1-cyano-1-heptylcyclohexane-cis-4-carboxylate
p-(5-octylpyridin-2-yl)phenyl r-1-cyano-1-heptylcyclohexane-cis-4-carboxylate
p-(5-nonylpyridin-2-yl)phenyl r-1-cyano-1-heptylcyclohexane-cis-4-carboxylate
p-(5-decylpyridin-2-yl)phenyl r-1-cyano-1-heptylcyclohexane-cis-4-carboxylate
p-(5-butoxypyridin-2-yl)phenyl r-1-cyano-1-heptylcyclohexane-cis-4-carboxylate
p-(5-pentoxypyridin-2-yl)phenyl r-1-cyano-1-heptylcyclohexane-cis-4-carboxylate
p-(5-hexoxypyridin-2-yl)phenyl r-1-cyano-1-heptylcyclohexane-cis-4-carboxylate
p-(5-heptoxypyridin-2-yl)phenyl r-1-cyano-1-heptylcyclohexane-cis-4-carboxylate
p-(5-octoxypyridin-2-yl)phenyl r-1-cyano-1-heptylcyclohexane-cis-4-carboxylate
p-(5-nonoxypyridin-2-yl)phenyl r-1-cyano-1-heptylcyclohexane-cis-4-carboxylate
p-(5-decoxypyridin-2-yl)phenyl r-1-cyano-1-heptylcyclohexane-cis-4-carboxylate
p-(5-propylpyridin-2-yl)phenyl r-1-cyano-1-octylcyclohexane-cis-4-carboxylate
p-(5-butylpyridin-2-yl)phenyl r-1-cyano-1-octylcyclohexane-cis-4-carboxylate
p-(5-pentylpyridin-2-yl)phenyl r-1-cyano-1-octylcyclohexane-cis-4-carboxylate

| | | |
|---|---|---|
| p-(5-hexylpyridin-2-yl)phenyl cyclohexane-cis-4-carboxylate | r-1-cyano-1-octylcy- | p-(5-decylpyrimidin-2-yl)phenyl r-1-cyano-cis-4-heptyl-cyclohexanecarboxylate |
| p-(5-heptylpyridin-2-yl)phenyl cyclohexane-cis-4-carboxylate | r-1-cyano-1-octylcy- | 4-cyano-4-heptylcyclohexyl 5-propylpyridine-2-carboxylate |
| p-(5-octylpyridin-2-yl)phenyl cyclohexane-cis-4-carboxylate | r-1-cyano-1-octylcy- | 4-cyano-4-heptylcyclohexyl 5-butylpyridine-2-carboxylate |
| p-(5-nonylpyridin-2-yl)phenyl cyclohexane-cis-4-carboxylate | r-1-cyano-1-octylcy- | 4-cyano-4-heptylcyclohexyl 5-pentylpyridine-2-carboxylate |
| p-(5-decylpyridin-2-yl)phenyl cyclohexane-cis-4-carboxylate | r-1-cyano-1-octylcy- | 4-cyano-4-heptylcyclohexyl 5-hexylpyridine-2-carboxylate |
| p-(5-butoxypyridin-2-yl)phenyl cyclohexane-cis-4-carboxylate | r-1-cyano-1-octylcy- | 4-cyano-4-heptylcyclohexyl 5-heptylpyridine-2-carboxylate |
| p-(5-pentoxypyridin-2-yl)phenyl cyclohexane-cis-4-carboxylate | r-1-cyano-1-octylcy- | 4-cyano-4-heptylcyclohexyl 5-octylpyridine-2-carboxylate |
| p-(5-hexoxypyridin-2-yl)phenyl cyclohexane-cis-4-carboxylate | r-1-cyano-1-octylcy- | 4-cyano-4-heptylcyclohexyl 5-nonylpyridine-2-carboxylate |
| p-(5-heptoxypyridin-2-yl)phenyl cyclohexane-cis-4-carboxylate | r-1-cyano-1-octylcy- | 4-cyano-4-heptylcyclohexyl 5-decylpyridine-2-carboxylate |
| p-(5-octoxypyridin-2-yl)phenyl cyclohexane-cis-4-carboxylate | r-1-cyano-1-octylcy- | 4-cyano-4-heptylcyclohexyl 5-butoxypyridine-2-carboxylate |
| p-(5-nonoxypyridin-2-yl)phenyl cyclohexane-cis-4-carboxylate | r-1-cyano-1-octylcy- | 4-cyano-4-heptylcyclohexyl 5-pentoxypyridine-2-carboxylate |
| p-(5-decoxypyridin-2-yl)phenyl cyclohexane-cis-4-carboxylate | r-1-cyano-1-octylcy- | 4-cyano-4-heptylcyclohexyl 5-hexoxypyridine-2-carboxylate |
| p-(5-propylpyridin-2-yl)phenyl cyclohexane-cis-4-carboxylate | r-1-cyano-1-nonylcy- | 4-cyano-4-heptylcyclohexyl 5-heptoxypyridine-2-carboxylate |
| p-(5-butylpyridin-2-yl)phenyl cyclohexane-cis-4-carboxylate | r-1-cyano-1-nonylcy- | 4-cyano-4-heptylcyclohexyl 5-octoxypyridine-2-carboxylate |
| p-(5-pentylpyridin-2-yl)phenyl cyclohexane-cis-4-carboxylate | r-1-cyano-1-nonylcy- | 4-cyano-4-heptylcyclohexyl 5-nonoxypyridine-2-carboxylate |
| p-(5-hexylpyridin-2-yl)phenyl cyclohexane-cis-4-carboxylate | r-1-cyano-1-nonylcy- | 4-cyano-4-heptylcyclohexyl 5-decoxypyridine-2-carboxylate |
| p-(5-heptylpyridin-2-yl)phenyl cyclohexane-cis-4-carboxylate | r-1-cyano-1-nonylcy- | 4-cyano-4-heptylcyclohexyl 2-propylpyridine-5-carboxylate |
| p-(5-octylpyridin-2-yl)phenyl cyclohexane-cis-4-carboxylate | r-1-cyano-1-nonylcy- | 4-cyano-4-heptylcyclohexyl 2-butylpyridine-5-carboxylate |
| p-(5-nonylpyridin-2-yl)phenyl cyclohexane-cis-4-carboxylate | r-1-cyano-1-nonylcy- | 4-cyano-4-heptylcyclohexyl 2-pentylpyridine-5-carboxylate |
| p-(5-decylpyridin-2-yl)phenyl cyclohexane-cis-4-carboxylate | r-1-cyano-1-nonylcy- | 4-cyano-4-heptylcyclohexyl 2-hexylpyridine-5-carboxylate |
| p-(5-butoxypyridin-2-yl)phenyl cyclohexane-cis-4-carboxylate | r-1-cyano-1-nonylcy- | 4-cyano-4-heptylcyclohexyl 2-heptylpyridine-5-carboxylate |
| p-(5-pentoxypyridin-2-yl)phenyl cyclohexane-cis-4-carboxylate | r-1-cyano-1-nonylcy- | 4-cyano-4-heptylcyclohexyl 2-octylpyridine-5-carboxylate |
| p-(5-hexoxypyridin-2-yl)phenyl cyclohexane-cis-4-carboxylate | r-1-cyano-1-nonylcy- | 4-cyano-4-heptylcyclohexyl 2-nonylpyridine-5-carboxylate |
| p-(5-heptoxypyridin-2-yl)phenyl cyclohexane-cis-4-carboxylate | r-1-cyano-1-nonylcy- | 4-cyano-4-heptylcyclohexyl 2-decylpyridine-5-carboxylate |
| p-(5-octoxypyridin-2-yl)phenyl cyclohexane-cis-4-carboxylate | r-1-cyano-1-nonylcy- | 4-cyano-4-heptylcyclohexyl 2-butoxypyridine-5-carboxylate |
| p-(5-nonoxypyridin-2-yl)phenyl cyclohexane-cis-4-carboxylate | r-1-cyano-1-nonylcy- | 4-cyano-4-heptylcyclohexyl 2-pentoxypyridine-5-carboxylate |
| p-(5-decoxypyridin-2-yl)phenyl cyclohexane-cis-4-carboxylate | r-1-cyano-1-nonylcy- | 4-cyano-4-heptylcyclohexyl 2-hexoxypyridine-5-carboxylate |
| p-(5-propylpyrimidin-2-yl)phenyl r-1-cyano-cis-4-heptylcyclohexanecarboxylate | | 4-cyano-4-heptylcyclohexyl 2-heptoxypyridine-5-carboxylate |
| p-(5-butylpyrimidin-2-yl)phenyl r-1-cyano-cis-4-heptyl-cyclohexanecarboxylate | | 4-cyano-4-heptylcyclohexyl 2-octoxypyridine-5-carboxylate |
| p-(5-pentylpyrimidin-2-yl)phenyl r-1-cyano-cis-4-heptylcyclohexanecarboxylate | | 4-cyano-4-heptylcyclohexyl 2-nonoxypyridine-5-carboxylate |
| p-(5-hexylpyrimidin-2-yl)phenyl r-1-cyano-cis-4-heptyl-cyclohexanecarboxylate | | 4-cyano-4-heptylcyclohexyl 2-decoxypyridine-5-carboxylate |
| p-(5-heptylpyrimidin-2-yl)phenyl r-1-cyano-cis-4-heptylcyclohexanecarboxylate | | 2-propylpyridin-5-yl r-1-cyano-1-heptylcyclohexane-cis-4-carboxylate |
| p-(5-octylpyrimidin-2-yl)phenyl r-1-cyano-cis-4-heptyl-cyclohexanecarboxylate | | 2-butylpyridin-5-yl r-1-cyano-1-heptylcyclohexane-cis-4-carboxylate |
| p-(5-nonylpyrimidin-2-yl)phenyl r-1-cyano-cis-4-heptylcyclohexanecarboxylate | | 2-pentylpyridin-5-yl r-1-cyano-1-heptylcyclohexane-cis-4-carboxylate |

2-hexylpyridin-5-yl r-1-cyano-1-heptylcyclohexane-cis-4-carboxylate
2-heptylpyridin-5-yl r-1-cyano-1-heptylcyclohexane-cis-4-carboxylate
2-octylpyridin-5-yl r-1-cyano-1-heptylcyclohexane-cis-4-carboxylate -carboxylate
2-nonylpridin-5-yl r-1-cyano-2heptylcyclohexane-cis-4-carboxylate
2-decylpyridin-5-yl r-1-cyano-1-heptylcyclohexane-cis-4-carboxylate
2-butoxypyridin-5-yl r-1-cyano-1-heptylcyclohexane-cis-4-carboxylate
2-pentoxypyridin-5-yl r-1-cyano-1-heptylcyclohexane-cis-4-carboxylate
2-hexoxypyridin-5-yl r-1-cyano-1-heptylcyclohexane-cis-4-carboxylate
2-heptoxypyridin-5-yl r-1-cyano-1-heptylcyclohexane-cis-4-carboxylate
2-octoxypyridin-5-yl r-1-cyano-1-heptylcyclohexane-cis-4-carboxylate
2-nonoxypyridin-5-yl r-1-cyano-1-heptylcyclohexane-cis-4-carboxylate
2-decoxypyridin-5-yl r-1-cyano-1-heptylcyclohexane-cis-4-carboxylate
6-(p-propylphenyl)pyridazin-3-yl r-1-cyano-1-heptylcyclohexane-cis-4-carboxylate
6-(p-butylphenyl)pyridazin-3-yl r-1-cyano-1-heptylcyclohexane-cis-4-carboxylate
6-(p-pentylphenyl)pyridazin-3-yl r-1-cyano-1-heptylcyclohexane-cis-4-carboxylate
6-(p-hexylphenyl)pyridazin-3-yl r-1-cyano-1-heptylcyclohexane-cis-4-carboxylate
6-(p-heptylphenyl)pyridazin-3-yl r-1-cyano-1-heptylcyclohexane-cis-4-carboxylate
6-(p-octylphenyl)pyridazin-3-yl r-1-cyano-1-heptylcyclohexane-cis-4-carboxylate
6-(p-nonylphenyl)pyridazin-3-yl r-1-cyano-1-heptylcyclohexane-cis-4-carboxylate
6-(p-decylphenyl)pyridazin-3-yl r-1-cyano-1-heptylcyclohexane-cis-4-carboxylate
6-(p-butoxyphenyl)pyridazin-3-yl r-1-cyano-1-heptylcyclohexane-cis-4-carboxylate
6-(p-pentoxyphenyl)pyridazin-3-yl r-1-cyano-1-heptylcyclohexane-cis-4-carboxylate
6-(p-hexoxyphenyl)pyridazin-3-yl r-1-cyano-1-heptylcyclohexane-cis-4-carboxylate
6-(p-heptoxyphenyl)pyridazin-3-yl r-1-cyano-1-heptylcyclohexane-cis-4-carboxylate
6-(p-octoxyphenyl)pyridazin-3-yl r-1-cyano-1-heptylcyclohexane-cis-4-carboxylate
6-(p-nonoxyphenyl)pyridazin-3-yl r-1-cyano-1-heptylcyclohexane-cis-4-carboxylate
6-(p-decoxyphenyl)pyridazin-3-yl r-1-cyano-1-heptylcyclohexane-cis-4-carboxylate
5-(p-propylphenyl)pyrazin-5-yl r-1-cyano-1-heptylcyclohexane-cis-4-carboxylate
5-(p-butylphenyl)pyrazin-5-yl r-1-cyano-1-heptylcyclohexane-cis-4-carboxylate
5-(p-pentylphenyl)pyrazin-5-yl r-1-cyano-1-heptylcyclohexane-cis-4-carboxylate
5-(p-octylphenyl)pyrazin-5-yl r-1-cyano-1-heptylcyclohexane-cis-4-carboxylate
5-(p-nonylphenyl)pyrazin-5-yl r-1-cyano-1-heptylcyclohexane-cis-4-carboxylate
5-(p-decylphenyl)pyrazin-5-yl r-1-cyano-1-heptylcyclohexane-cis-4-carboxylate
5-(p-butoxyphenyl)pyrazin-5-yl r-1-cyano-1-heptylcyclohexane-cis-4-carboxylate
5-(p-pentoxyphenyl)pyrazin-5-yl r-1-cyano-1-heptylcyclohexane-cis-4-carboxylate
5-(p-hexoxyphenyl)pyrazin-5-yl r-1-cyano-1-heptylcyclohexane-cis-4-carboxylate
5-(p-heptoxyphenyl)pyrazin-5-yl r-1-cyano-1-heptylcyclohexane-cis-4-carboxylate
5-(p-octoxyphenyl)pyrazin-5-yl r-1-cyano-1-heptylcyclohexane-cis-4-carboxylate
5-(p-nonoxyphenyl)pyrazin-5-yl r-1-cyano-1-heptylcyclohexane-cis-4-carboxylate
5-(p-decoxyphenyl)pyrazin-5-yl r-1-cyano-1-heptylcyclohexane-cis-4-carboxylate
4-cyano-4-heptylcyclohexyl p-(5-propylpyrimidin-2-yl)benzoate
4-cyano-4-heptylcyclohexyl p-(5-butylpyrimidin-2-yl)benzoate
4-cyano-4-heptylcyclohexyl p-(5-pentylpyrimidin-2-yl)benzoate
4-cyano-4-heptylcyclohexyl p-(5-hexylpyrimidin-2-yl)benzoate
4-cyano-4-heptylcyclohexyl p-(5-heptylpyrimidin-2-yl)benzoate
4-cyano-4-heptylcyclohexyl p-(5-octylpyrimidin-2-yl)benzoate
4-cyano-4-heptylcyclohexyl p-(5-nonylpyrimidin-2-yl)benzoate
4-cyano-4-heptylcyclohexyl p-(5-decylpyrimidin-2-yl)benzoate
4-cyano-4-heptylcyclohexyl p-(5-butoxypyrimidin-2-yl)benzoate
4-cyano-4-heptylcyclohexyl p-(5-pentoxypyrimidin-2-yl)benzoate
4-cyano-4-heptylcyclohexyl p-(5-hexoxypyrimidin-2-yl)benzoate
4-cyano-4-heptylcyclohexyl p-(5-heptoxypyrimidin-2-yl)benzoate
4-cyano-4-heptylcyclohexyl p-(5-octoxypyrimidin-2-yl)benzoate
4-cyano-4-heptylcyclohexyl p-(5-nonoxypyrimidin-2-yl)benzoate
4-cyano-4-heptylcyclohexyl p-(5-decoxypyrimidin-2-yl)benzoate
4-cyano-4-heptylcyclohexyl p-(5-propylpyridin-2-yl)benzoate
4-cyano-4-heptylcyclohexyl p-(5-butylpyridin-2-yl)benzoate
4-cyano-4-heptylcyclohexyl p-(5-pentylpyridin-2-yl)benzoate
4-cyano-4-heptylcyclohexyl p-(5-hexylpyridin-2-yl)benzoate
4-cyano-4-heptylcyclohexyl p-(5-heptylpyridin-2-yl)benzoate
4-cyano-4-heptylcyclohexyl p-(5-octylpyridin-2-yl)benzoate
4-cyano-4-heptylcyclohexyl p-(5-nonylpyridin-2-yl)benzoate
4-cyano-4-heptylcyclohexyl p-(5-decylpyridin-2-yl)benzoate
4-cyano-4-heptylcyclohexyl p-(5-butoxypyridin-2-yl)benzoate
4-cyano-4-heptylcyclohexyl p-(5-pentoxypyridin-2-yl)benzoate
4-cyano-4-heptylcyclohexyl p-(5-hexoxypyridin-2-yl)benzoate
4-cyano-4-heptylcyclohexyl p-(5-heptoxypyridin-2-yl)benzoate
4-cyano-4-heptylcyclohexyl p-(5-octoxypyridin-2-

4-cyano-4-heptylcyclohexyl p-(5-nonoxypyridin-2-yl)benzoate 4-cyano-4-heptylcyclohexyl p-(5-decoxypyridin-2-yl)benzoate Example 11

A mixture of 61.2 g of 2-p-hydroxyphenyl-5-heptylpyridine [obtainable from 2-p-methoxyphenyl-5-heptylpyridine by basic ether cleavage with potassium tert-butylate in N-methylpyrrolidone at 150°], 35 g of potassium carbonate and 85 g of 4-cyano-4-heptylcyclohexyl methyl iodide [obtainable by reduction of ethyl 4-cyano-4-heptylcyclohexanecarboxylate with LiBH$_4$, conversion of the carbinol into the mesylate and Finkelstein reaction with NaI/ acetone]in 500 ml of dimethylformamide is stirred under a nitrogen atmosphere at 110° for 8 hours. After the usual working up, r-1-cyano-1-heptyl-cis-4-[p-(5-heptylpyridin2-yl)phenoxymethyl]-cyclohexane.

The following are prepared analogously:

r-1-cyano-1-octyl-cis-4-[p-(5-propylpyridin-2-yl)phenoxymethyl]cyclohexane r-1-cyano-1-octyl-cis-4-[p-(5-butylpyridin-2-yl)phenoxymethyl]cyclohexane r-1-cyano-1-octyl-cis-4-[p-(5-pentylpyridin-2-yl)phenoxymethyl]cyclohexane r-1-cyano-1-octyl-cis-4-[p-(5-hexylpyridin-2-yl)phenoxymethyl]cyclohexane r-1-cyano-1-octyl-cis-4-[P-(5-heptylpyridin-2-yl)phenoxymethyl]cyclohexane r-1-cyano-1-octyl-cis-4-[p-(5-octylpyridin-2-yl)phenoxymethyl]cyclohexane r-1-cyano-1-octyl-cis-4-[p-(5-nonylpyridin-2-yl)phenoxymethyl]cyclohexane r-1-cyano-1-octyl-cis-4-[p-(5-decylpyridin-2-yl)phenoxymethyl]cyclohexane r-1-cyano-1-heptyl-cis-4-[p-(5-propylpyrimidin-2-yl)phenoxymethyl]cyclohexane r-1-cyano-1-heptyl-cis-4-[p-(5-butylpyrimidin-2-yl)phenoxymethyl]cyclohexane r-1-cyano-1-heptyl-cis-4-[p-(5-pentylpyrimidin-2-yl)phenoxymethyl]cyclohexane r-1-cyano-1-heptyl-cis-4-[p-(5-hexylpyrimidin-2-yl)phenoxymethyl]cyclohexane r-1-cyano-1-heptyl-cis-4-[p-(5-heptylpyrimidin-2-yl)phenoxymethyl]cyclohexane r-1-cyano-1-heptyl-cis-4-[p-(5-octylpyrimidin-2-yl)phenoxymethyl]cyclohexane r-1-cyano-1-heptyl-cis-4-[p-(5-nonylpyrimidin-2-yl)phenoxymethyl]cyclohexane r-1-cyano-1-heptyl-cis-4-[p-(5-decylpyrimidin-2-yl)phenoxymethyl]cyclohexane r-1-cyano-1-octyl-cis-4-[p-(5-propylpyrimidin-2-yl)phenoxymethyl]cyclohexane r-1-cyano-1-octyl-cis-4-[p-(5-butylpyrimidin-2-yl)phenoxymethyl]cyclohexane r-1-cyano-1-octyl-cis-4-[p-(5-pentylpyrimidin-2-yl)phenoxymethyl]cyclohexane r-1-cyano-1-octyl-cis-4-[p-(5-hexylpyrimidin-2-yl)phenoxymethyl]cyclohexane r-1-cyano-1-octyl-cis-4-[p-(5-heptylpyrimidin-2-yl)phenoxymethyl]cyclohexane r-1-cyano-1-octyl-cis-4-[p-(5-octylpyrimidin-2-yl)phenoxymethyl]cyclohexane r-1-cyano-1-octyl-cis-4-[p-(5-nonylpyrimidin-2-yl)phenoxymethyl]cyclohexane r-1-cyano-1-octyl-cis-4-[p-(5-decylpyrimidin-2-yl)phenoxymethyl]cyclohexane

We claim:

1. A nitrogen-containing heterocyclic compound of the formula

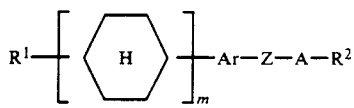

wherein

R$^1$ and R$^2$ in each case denote a straight-chain alkyl group having 1 to 15 C atoms, wherein one or more CH$_2$ groups can be replaced by a grouping selected from the group comprising —O—, —S—, —CO—, —O—CO—, —O—COO—, —Co—O—, —CH=CH—, or a combination of two of said groupings with the proviso that two heteroatoms are not directly linked to each other, or one of R$^1$ and R$^2$ denotes an optically active organic radical of the formula

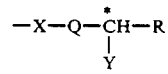

wherein

X denotes —CO—O, —O—CO—, —O—CO—O—, —CO—, —O—, —S—, —CH=CH—, —CH=CH—COO—or a single bond, Q denotes alkylene containing 1 to 5 C atoms, wherein a CH$_2$ group not linked to X may also be replaced by —O—, —CO—, —O—CO—, —CO—O—, or —CH=CH—, or a single bond, Y denotes CN, halogen, methyl or methoxy, and R denotes an alkyl group differing from Y and containing 1 to 18 C atoms;

m denotes 0 or 1;

Ar denotes one of the following formulae

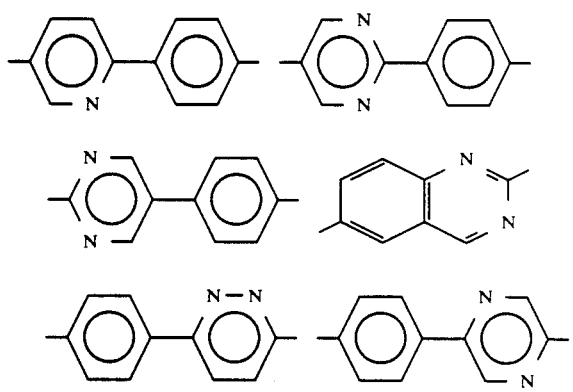

or the mirror image thereof, and if m =1, Ar can also denote 1,4-phenylene, wherein one or more CH groups are replaced by N;

denotes —CO—O—, —O—CO—, —CH$_2$O—, —OCH$_2$—, —CH$_2$CH$_2$—, —CH=CH—or a single bond; and A denotes a group of the formula

or the mirror image thereof.

2. A nitrogen-containing heterocyclic compound according to claim 1, wherein $R^1$ and $R^2$ are straight-chain alkyl, alkoxy, alkanoyloxy, alkoxycarbonyl, oxaalkyl or alkoxycarbonyloxy each having 1 to 15 C atoms.

3. A nitrgoen-containing heterocyclic compound according to claim 1, wherein $R^1$ and $R^2$ are straight-chain alkyl or alkoxy each having 5 to 12 C atoms.

4. A nitrogen-containing heterocyclic compound according to claim 1, wherein m=0.

5. A nitrogen-containing herterocyclic compound according to claim 1, wherein one of $R^1$ and $R^2$ is an optically active organic radical of the formula

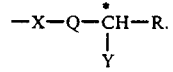

6. A nitrogen-containing heterocyclic compound according to claim 1, wherein Ar denotes

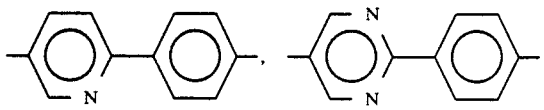

or the mirror image thereof.

7. A nitrogen-containing heterocyclic compound according to claim 1, wherein Z denotes —CO—O— or —O—CO—.

* * * * *

UNITED STATES PATENT AND TRADEMARK OFFICE
CERTIFICATE OF CORRECTION

PATENT NO. : 5,002,694

DATED : March 26, 1991

INVENTOR(S) : Wachtler et al

It is certified that error appears in the above-identified patent and that said Letters Patent is hereby corrected as shown below:

Title page:

Item (75) Inventors; Fourth Inventor's City and Country:

Reads: "Yokohama, Japan"

Should Read: --Darmstadt, Federal Republic of Germany.--

Signed and Sealed this

Twenty-first Day of July, 1992

Attest:

DOUGLAS B. COMER

Attesting Officer

Acting Commissioner of Patents and Trademarks